(12) United States Patent
Farrell et al.

(10) Patent No.: US 12,726,405 B2
(45) Date of Patent: Sep. 1, 2026

(54) METHOD AND SYSTEM FOR NETWORK SEGMENT ISOLATION WITH VARIABLE CONFIGURATIONS IN A VEHICLE

(71) Applicant: GM GLOBAL TECHNOLOGY OPERATIONS LLC, Detroit, MI (US)

(72) Inventors: Brian Farrell, Troy, MI (US); Mohamed A. Layouni, Fraser, MI (US); Michael Potts, Lenox Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 52 days.

(21) Appl. No.: 19/033,556

(22) Filed: Jan. 22, 2025

(65) Prior Publication Data

US 2026/0213998 A1 Jul. 23, 2026

(51) Int. Cl.

| | |
|---|---|
| ***H04L 41/082*** | (2022.01) |
| ***H04L 12/46*** | (2006.01) |
| ***H04L 41/0869*** | (2022.01) |
| ***H04L 61/103*** | (2022.01) |

(52) U.S. Cl.
CPC ........ *H04L 41/082* (2013.01); *H04L 12/4675* (2013.01); *H04L 41/0869* (2013.01); *H04L 61/103* (2013.01)

(58) Field of Classification Search
CPC ............... H04L 41/082; H04L 12/4675; H04L 41/0869; H04L 61/103
USPC .......................................................... 709/238
See application file for complete search history.

(56) References Cited

U.S. PATENT DOCUMENTS

| | | | | |
|---|---|---|---|---|
| 8,705,527 | B1 * | 4/2014 | Addepalli | H04W 72/20 370/389 |
| 2020/0382446 | A1 * | 12/2020 | Jung | H04L 12/40 |
| 2023/0360448 | A1 | 11/2023 | Fang et al. | |
| 2024/0069928 | A1 * | 2/2024 | Mattis | H04L 67/025 |
| 2024/0095057 | A1 * | 3/2024 | Borgonovo | G06F 9/45558 |

* cited by examiner

*Primary Examiner* — Nicholas R Taylor
(74) *Attorney, Agent, or Firm* — Quinn IP Law

(57) ABSTRACT

A system and method for a network within the vehicle that includes a microcontroller unit (MCU) located within the vehicle, which includes an internal ethernet switch and an auxiliary core manager, where the MCU hosts one or more software builds and the auxiliary core manager manages the internal ethernet switch and the software builds. An external ethernet switch located within the vehicle couples one or more ports of the internal ethernet switch to one or more devices through one or more virtual local area networks (VLANs) where upon an occurrence of a reflash event the auxiliary core manager generates a VLAN configuration and filtering rule for the internal switch, associating the software builds to the MCU ports based on a MAC and IP address of each MCU port.

20 Claims, 8 Drawing Sheets

200
210-1
210-2
212-1
212-2
212-3
212-4
212-5
Body Build IP/MAC Adr. 1
XXX Build IP/MAC Adr. 2
YYY Build IP/MAC Adr. 3
ZZZ Build IP/MAC Adr. 4
ABCD Build IP/MAC Adr. 5
Internal Switch (Ethernet Switch)
(Ethernet Isolation: VLAN Enforcement, Spoof Checking, ACL, TCAM, etc.)
Internal Switch
(Ethernet Isolation: ...)
Aux Core Manager
Aux Core Manager
215-1
215-2
220-1
220-2
230-1
230-2
230-3
230-4
230-5
230-6
235-1
235-2
237
240
E2B #1
250-1
E2B #2
250-2
E2B #N
250-N
SE-Dev #1
255-1

600

METHOD AND SYSTEM FOR NETWORK SEGMENT ISOLATION WITH VARIABLE CONFIGURATIONS IN A VEHICLE

INTRODUCTION

Vehicles are rapidly integrating ever increasing technological components into their systems. Special use microcontrollers, technologies, and sensors may be used in many different applications in a vehicle. Automotive microcontrollers and sensors may be utilized in enhancing automated structures that offer state-of-the-art experience and services to the customers, for example in tasks such as body control, camera vision, information display, security, autonomous controls, etc. Further, functions such as adaptive cruise control, lane change assist, and vehicle proximity detection may use a variety of sensors using light detection and ranging (LIDAR), radio detection and ranging (RADAR), ultrasonic, and other wireless technologies to accomplish their functions.

However, the prolific use of such advanced systems may require periodic software updates to add and revise various functions. Further, such updates, for various reasons, may be more efficiently executed, for example due to size, if propagated through the multiple microcontrollers in a new distribution scheme. Thus, the ability to reflash software builds within the microcontrollers is crucial to vehicle operations.

SUMMARY

Disclosed herein systems and methods of network segment isolation with variable configurations in a vehicle. As disclosed herein, microcontrollers, or microcontroller units, referred to as a MCU or MCUs, periodically may receive software uploads or updates, which may be referred to as a reflash event. Software uploads may contain one or more software builds, where a software build may be associated with a particular function of the vehicle, for example a braking function, a body control function, a navigations function, etc. Such examples are not meant to be limiting, but rather are examples of possible functionalities.

Further, modern vehicle architecture, including software defined vehicles, may consist of multiple MCUs with advanced functionality and cybersecurity capabilities. The MCUs may typically host multiple software containers, each dedicated to a vehicle function. End devices may be used to control sensors and actuators used in the operation of a vehicle. Each end device may only accept commands from a specific software container among the software containers running on one or more MCUs. The use of network segmentation may be used to isolate traffic between end devices and authorized software containers from the remainder of the network. Such segmentation and isolation are orthogonal to cryptographic authentication but may be used in conjunction with authentication methods as desired. Further, such segmentation and isolation may be used when a software container changes its MAC addresses and location, either within an existing MCU or in the case of relocating the software container, or software build, to another MCU.

Thus, a system of network segment isolation with variable configurations in a vehicle may include a network within the vehicle. The network may include a microcontroller unit (MCU), located within the vehicle, which includes an internal ethernet switch and an auxiliary core manager, wherein the MCU is designed to host one or more software builds and the auxiliary core manager may be used to manage the internal ethernet switch as well as the different builds running on the MCU. The system may also include an external ethernet switch located within the vehicle to couple the one or more ports of the internal ethernet switch to one or more devices through one or more virtual local area networks (VLANs). Then, upon an occurrence of a reflash event, the auxiliary core manager may execute filtering rules to partition the one or more VLANs by executing filtering rules to partition the network, or communication pathways. The auxiliary core manager may also generate a VLAN configuration and filtering rule for the internal switch based on an access control policy and to identify an association of the one or more software builds to one or more MCU ports based on a MAC and IP address of each MCU port. The auxiliary core manager may also update a VLAN configuration and filtering rule on the external switch to enable one or more VLANs based on the association of the one or more software builds to the one or more MCU ports.

Another aspect of the system may include a second MCU, located within the vehicle, which includes a second internal ethernet switch and a second auxiliary core manager, wherein the second MCU may host one or more software builds and the second auxiliary core manager manages the second internal ethernet switch.

Another aspect of the system may include where the filtering rules may be applied at the external ethernet switch and where each of the one or more software builds may be associated with a fixed IP address and a location dependent MAC address.

Another aspect of the system may include where the auxiliary core manager determines the location of the one or more software builds utilizing an Address Resolution Protocol (ARP).

Another aspect of the system may include where the filtering rules are applied at the internal ethernet switch and where each of the one or more software builds may be associated with a fixed IP address and a location dependent MAC address.

Another aspect of the system may include where the internal ethernet switch is used to verify communication between a software build and a device and where the verification includes matching configuration data including the location dependent MAC address with an associated VLAN.

Another aspect of the system may include where the configuration data is included within an auxiliary core manager build.

Another aspect of the system may include where the external switch is coupled to an edge to bus device or a specialized electronic device.

Another aspect of the system may include where the auxiliary core manager is further used to verify a configuration update at the external ethernet switch that includes receipt of a digital signature using a valid certificate.

Another aspect of the system may include where the auxiliary core manager is further used to verify a configuration update at the internal ethernet switch that includes either a subroutine-based challenge-response or a calibration file-based method.

Another aspect of the disclosure may include a method for network segment isolation with variable configurations in a vehicle that includes hosting, within a microcontroller unit (MCU), located within the vehicle, one or more software builds, where the MCU may further include an internal ethernet switch and an auxiliary core manager to manage the internal ethernet switch and one or more software builds running on the MCU. The method may also include coupling an external ethernet switch located within the vehicle to the internal ethernet switch, where the external ethernet switch couples one or more devices through one or more virtual local area networks (VLANs) to the internal ethernet switch. The method may also include generating a VLAN configuration and filtering rule for the internal switch based on an access control policy in addition to identifying an association of the one or more software builds to one or more MCU ports based on a MAC and IP address of each MCU port and updating a VLAN configuration and filtering rule on the external switch to enable one or more VLANs based on the association of the one or more software builds to the one or more MCU ports.

Another aspect of the method may include applying the VLAN configuration and filtering rule at the external ethernet switch and where each of the one or more software builds are associated with a fixed IP address and a location dependent MAC address.

Another aspect of the method may include determining, by the auxiliary core manager, the location of the one or more software builds utilizing an Address Resolution Protocol (ARP).

Another aspect of the method may include applying the VLAN configuration and filtering rule at the internal ethernet switch and wherein each of the one or more software builds are associated with a fixed IP address and a location dependent MAC address.

Another aspect of the method may include verifying, at the internal ethernet switch, communications between a software build and a device and wherein the verification includes matching configuration data including the location dependent MAC address with an associated VLAN.

Another aspect of the method may include where the configuration data is included within an auxiliary core manager build.

Another aspect of the method may include where the second segment is coupled to an edge to bus device or a specialized electronic device.

Another aspect of the method may include verifying a configuration update at the external ethernet switch that includes receipt of a digital signature using a valid certificate.

Another aspect of the method may include verifying, by the auxiliary core manager, a configuration update at the internal ethernet switch that includes either a subroutine-based challenge-response or a calibration file-based method.

Another aspect of the disclosure may include a system of network segment isolation with variable configurations in a vehicle in which a network within the vehicle may include a first microcontroller unit (MCU), located within the vehicle, that includes a first internal ethernet switch and a first auxiliary core manager, where the first MCU is used to host one or more software builds and the first auxiliary core manager is used to manage the first internal ethernet switch and the one or more software builds. The system may also include a second microcontroller unit (MCU), located within the vehicle, that includes a second internal ethernet switch and a second auxiliary core manager, where the second MCU may be used to host one or more software builds and the second auxiliary core manager may be used to manage the second internal ethernet switch. The system may also include an external ethernet switch located within the vehicle that may be used to couple the internal ethernet switch to one or more devices through one or more virtual local area networks (VLANs). The system may, upon an occurrence of a reflash event, utilize the auxiliary core manager to generate a VLAN configuration and filtering rule for the internal switch based on an access control policy and to identify an association of the one or more software builds to one or more MCU ports based on a MAC and IP address of each MCU port. Further, the auxiliary core manager may update a VLAN configuration and filtering rule on the external switch to enable one or more VLANs based on the association of the one or more software builds to the one or more MCU ports. Further, the VLAN configuration and filtering rule may be applied at the internal ethernet switch and at the external ethernet switch, where each of the one or more software builds may be associated with a fixed IP address and a location dependent MAC address and where the internal ethernet switch may verify communication between a software build and a device and where the verification includes matching configuration data including the location dependent MAC address with an associated VLAN. Further, the external switch may be coupled to an edge to bus device or a specialized electronic device.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
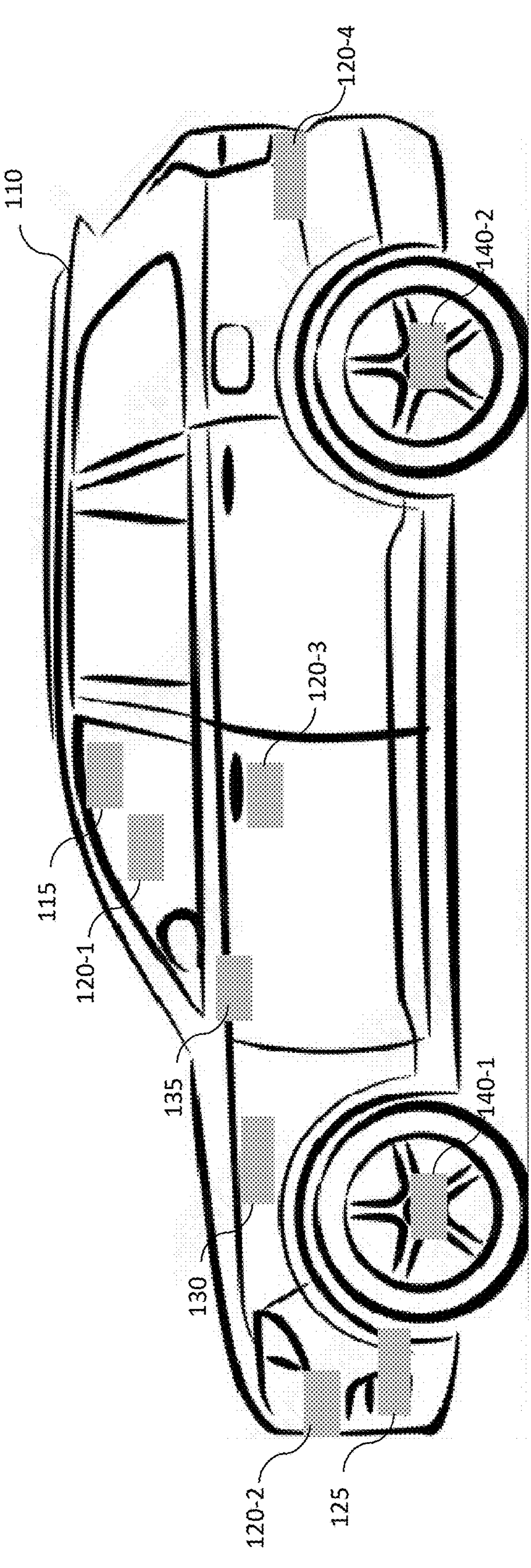
FIG. 1 is an illustration of a variety of possible vehicle sensors, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
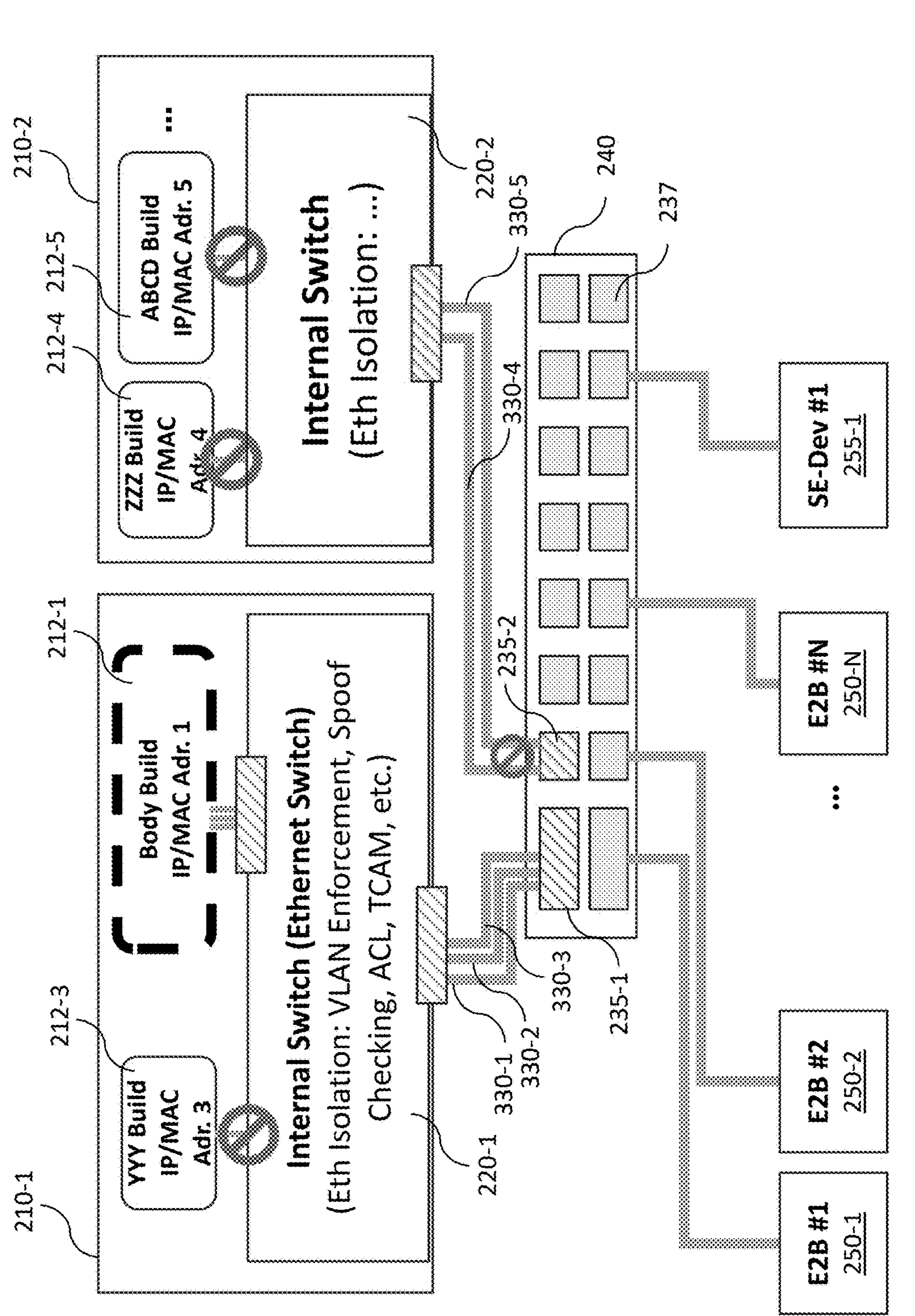
FIG. 3 is an illustration of a system of MCUs with network segment isolation, in accordance with the disclosure.

Referring to the drawings, the leftmost digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, cameras, sensors, processors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and automatic braking that may depend on information obtained from cameras and sensors on a vehicle. Microcontrollers, or microcontroller units (MCUs) may be utilized throughout a vehicle to host and execute code in software containers. Such software code may periodically be updated, without the need for physical replacement of MCUs.

FIG. 1 is an illustration of a vehicle with integrated sensors 100, according to an embodiment of the present disclosure. Such sensors may assist in the use of automated functions, such as autonomous driving and, as discussed, the control and management of vehicle functions within one or more MCUs. For example, vehicle 110 may include a Light Detection And Ranging (Lidar) sensor 115, an inward or outward camera sensor 120 (as shown by camera sensor 120-1-120-4), an ultrasonic sensor 125, an inertial measurement unit (IMU) sensor 130, a steering angle sensor 135, and wheel speed sensors 140-1 and 140-2, to name a few. Camera sensor 120 may also include multiple camera sensors placed around and throughout the vehicle, for example, camera sensor 120-1 mounted by the windshield facing forward, camera sensor 120-2 located at the front of the vehicle, facing forward, camera sensor 120-3 located at the left-side of the vehicle (with another side mounted camera sensor located at the right-side of the vehicle (not shown)), and camera-sensor 120-4 located at the rear of the vehicle. Other additional cameras and sensors at other locations may also be possible to provide additional views and/or operations.

Figure 2:
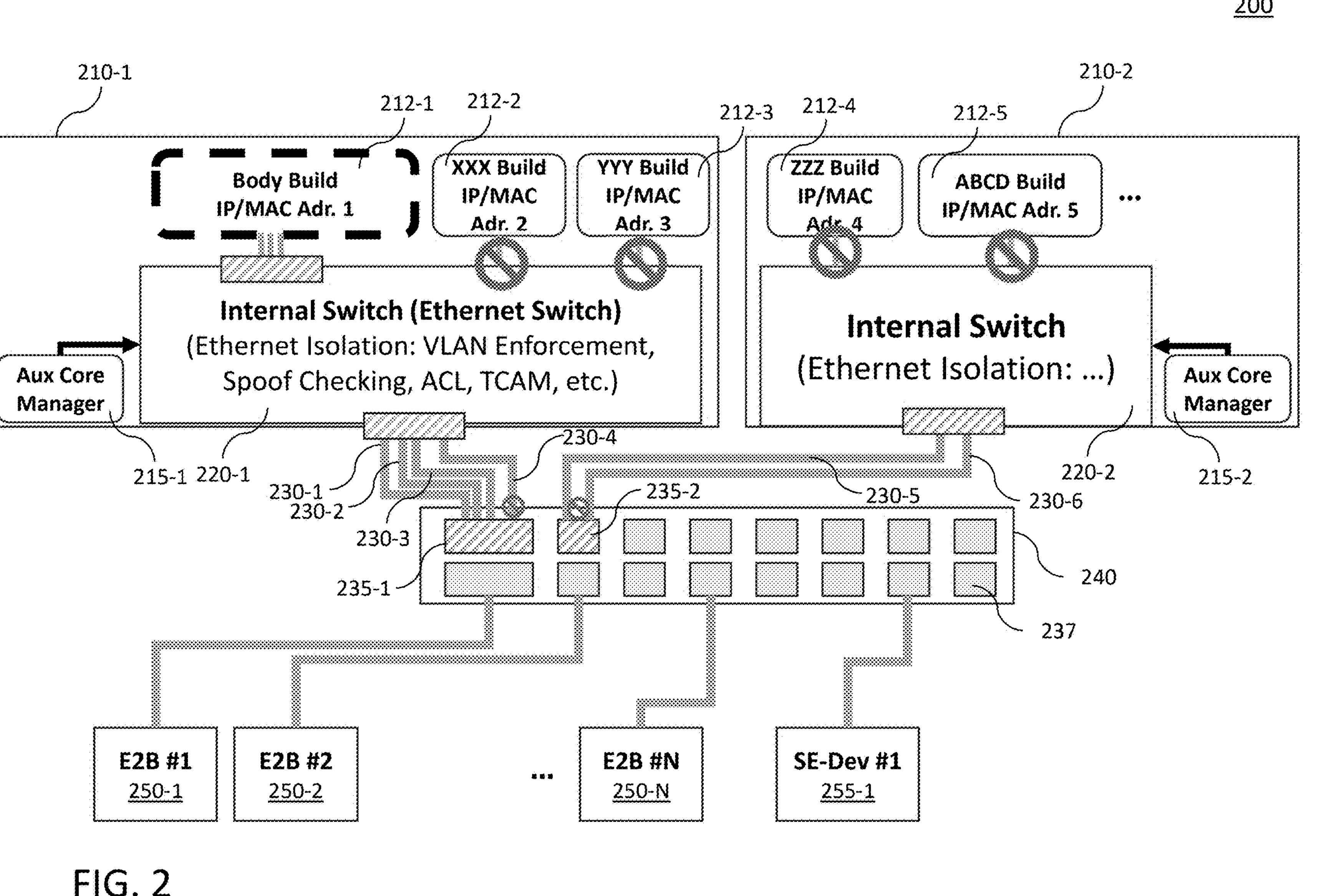
FIG. 2 is an illustration of a system of MCUs with network segment isolation, in accordance with the disclosure.

FIG. 2 is an illustration of a configuration 200 utilizing multiple MCUs, according to an embodiment of the present disclosure. Configuration 200 is shown as including two MCUs with MCU 210-1 and MCU 210-2. Both MCUs include an internal ethernet switch shown as internal switch 220-1 in MCU 210-1 and internal switch 220-2 in MCU 210-2. The internal switches may also be controlled by an auxiliary core manager with auxiliary core manager 215-1 controlling the internal switch 220-1 and with auxiliary core manager 215-2 controlling the internal switch 220-2. The auxiliary core manager may also coordinate the installation and configuration of software builds including installation at the proper locations as specified in a VLAN configuration and filtering rule. Also shown are a number of different software builds residing within each MCU. For example, body build 212-1 is highlighted as being the currently authorized build within MCU 210-1, but MCU 210-1 may also contain additional builds, for example, XXX build 212-2 and YYY build 212-3. In a similar fashion MCU 210-2 may also contain additional builds, for example ZZZ build 212-4 and ABCD build 212-5.

Configuration 200 may also include an external switch such as external switch 240 to connect one or more MCUs, e.g., MCU 210-1 and MCU 210-2 to other devices such as end devices including edge to bus (E2B) devices 250-1, 250-2, through to 250-N. The end devices may also include specialized electronic (SE) devices such as SE-DEV #1 255-1. In some embodiments, an SE device may include a processor and the ability to support cryptographic capabilities including authentication. In other embodiments E2B devices may not include a processor.

As shown in configuration 200 MCU 210-1 and MCU 210-2 may be coupled to an external switch, such as external switch 240 through the use of virtual local area networks (VLANs), such as VLAN 230-1, VLAN 230-2, VLAN 230-3, VLAN 230-4, VLAN 230-5, and VLAN 230-6. As will be discussed later, various VLANs may be configured such that authorized builds are able to communicate with one or more end devices while blocking other builds from accessing such end devices. Such VLAN configurations may be determined by the generation of a VLAN configuration and filtering rule based on an access control policy. For example, configuration 200 illustrates that the VLANs associated with XXX build 212-2, YYY build 212-3, ZZZ build 212-4, and ABCD build 212-5 are isolated from end devices 250-1 and 250-2. Such blocking, or filtering, may be accomplished at the internal switch level or at the external switch level, or both. In addition, each build may also be associated with a fixed IP address and a location dependent MAC address, which as will be shown, may be used to filter and enable/disable various VLANs on specific communication links such that an authorized build, such as Body build 212-1 in configuration 200, which may be moved within an MCU or between MCUs, may be able to communicate with devices it is authorized to communicate.

FIG. 3 is an illustration of a configuration 300 utilizing the same multiple MCUs as in configuration 200, according to an embodiment of the present disclosure. Configuration 300 illustrates moving body build 212-1 within the MCU 210-1 thereby changing the MAC address associated with body build 212-1. When moving a build within an MCU, or across to another MCU, as a result of a reflash event, the VLANs may be updated to reflect the change in location to allow an authorized build to communicate with the appropriate end device while blocking unauthorized builds. Thus, in configuration 300 the YYY build 212-3, ZZZ build 212-4, and ABCD build 212-5 may be isolated and blocked from communicating with end devices 250-1 and 250-2, either at the internal switch level or the external switch level, or both. In addition, VLANs may be reconfigured such that body build 212-1, end devices 250-1 and 250-2 are part of the same VLAN, for example through the use of VLAN 330-1, VLAN 330-2, VLAN 330-3, VLAN 330-4, and VLAN 330-5.

The term isolation in the context of this disclosure may not mean preventing a node from communicating at all. Instead, it may partition the entire group of network nodes into a set of disjoint subgroups such that the nodes that are configured to talk to each other are part of the same subgroup. Each subgroup may be assigned one or more VLANs, such that each may be dedicated to a functional topic. For example, the same subgroup may have a VLAN used for data, and a second one used for controls. When nodes of that subgroup want to send control message, they would tag the message with the ID of the control VLAN for that subgroup. When they want to send a data message, they would tag it with the ID of the data VLAN.

Different subgroups may have their own control and data VLANs. Certain subgroups may have functional VLANs that other subgroups may not have. Accordingly, a VLAN may be a way to identify a subgroup and channel dedicated for communication of a certain type (e.g., data, control, etc.)

Figure 4:
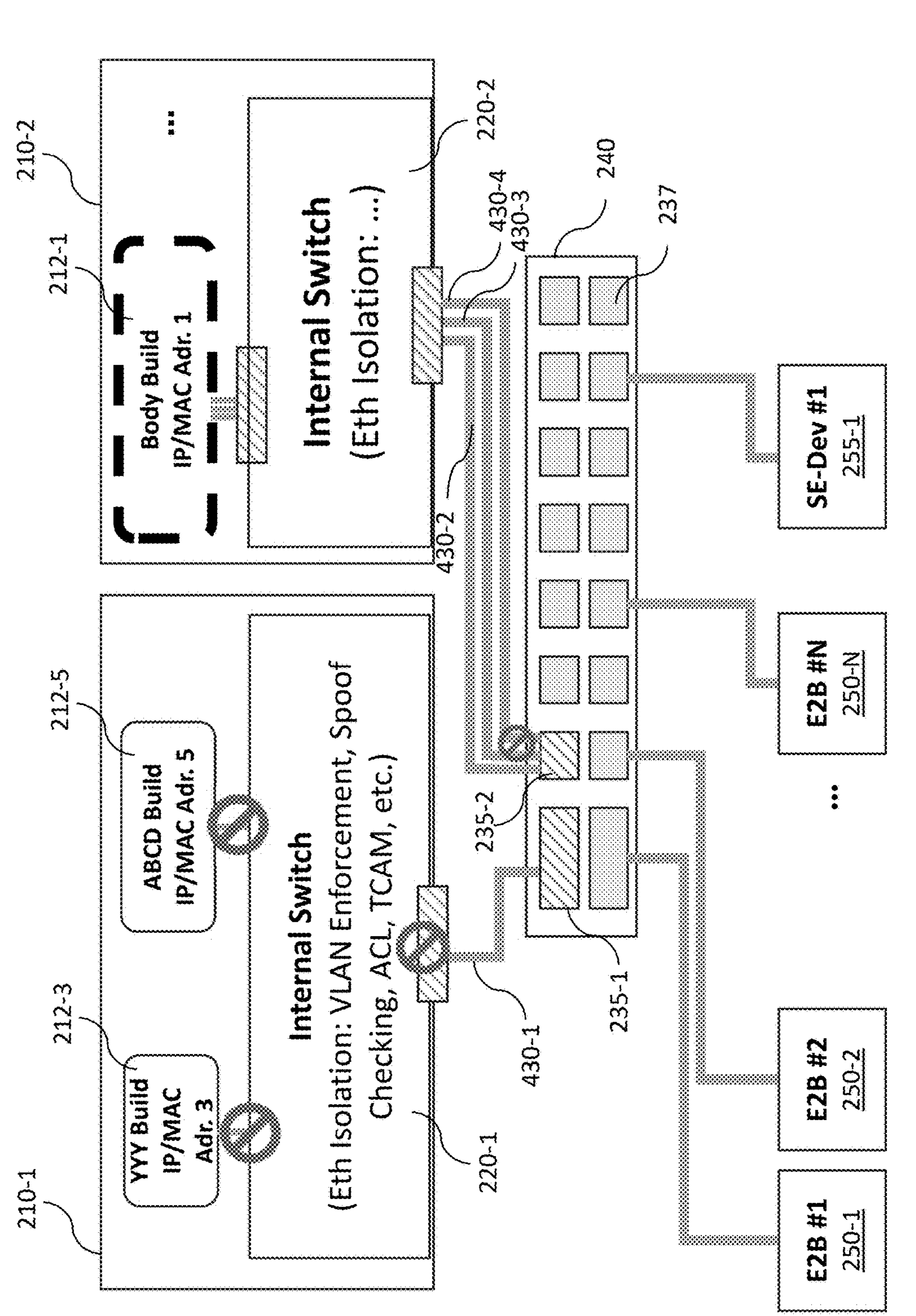
FIG. 4 is an illustration of a system of MCUs with network segment isolation, in accordance with the disclosure.

FIG. 4 is an illustration of a configuration 400 utilizing the same multiple MCUs as in configuration 200, according to an embodiment of the present disclosure. Configuration 400 illustrates moving body build 212-1 outside of MCU 210-1 and over to MCU 210-2. When moving a build within an MCU, or across to another MCU, as a result of a reflash event, the VLANs may be updated to reflect the change in location to allow an authorized build to communicate with the appropriate end device while blocking unauthorized builds. Thus, in configuration 400 the YYY build 212-3 and the ABCD build 212-5 may be blocked, either at the internal switch level or at the external switch level, or both. In addition, VLANs may be reconfigured such that the VLANs from body build 212-1 share a VLAN or more with end devices 250-1, 250-2, through to 250-N. For example, VLANs 430-2, 430-3, and 430-4 may include body build 212-1 and end devices 250-1, 250-2, through to 250-N, respectively, while VLAN 430-1 may not include devices 250-1, 250-2, through 250-N, thereby blocking the builds located in MCU 210-1 from communicating with those end devices.

Figure 5:
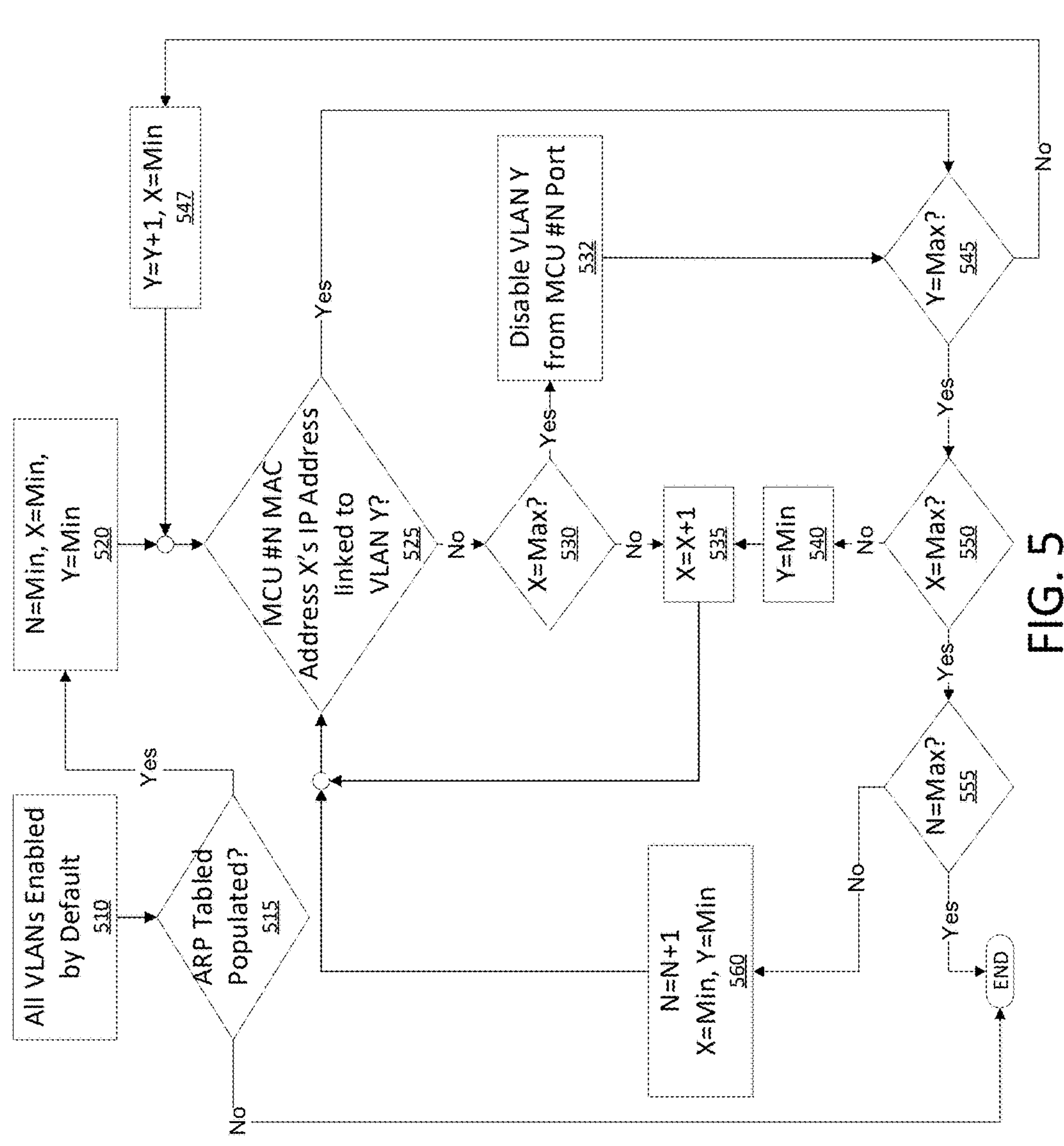
FIG. 5 is a flowchart of an ARP learning-based method for blocking VLANs, in accordance with the disclosure.

FIG. 5 is a flowchart of a method 500 utilizing address resolution protocol (ARP) for VLAN network segment isolation, according to an embodiment of the present disclosure. As previously mentioned, a build may be associated with a location dependent MAC address and a static IP address. Thus, in the event of a reflash event, i.e., a software update, to an MCU, the location of a build may change. There may be a number of reasons for a change in location of a build, for example, size of the software build, compatibility between an MCU and an end device, etc. For example, when a vehicle may be manufactured a particular build may have been located in an MCU, e.g., Body build 212-1 located in MCU 210-1 as shown in FIG. 2, but for some reason it is desired to move that build to another location, e.g., Body build 212-1 located in MCU 210-2 as shown in FIG. 4. While the IP address associated with body build 212-1 remains constant, due to its change in location the MAC address and the corresponding VLANs associated with body build 212-1 may need to be updated. Such an update may be accomplished by filtering at the external switch through the use of ARP learning as described below.

Table 1 below is an example of four builds located in four different MCUs at various location ports within each MCU. These are presented as examples and not meant to be limiting. As shown, before ARP learning each build location is associated with a particular MAC address and unknown IP addresses. In addition, the four VLANs associated with the builds are enabled for each build.

TABLE 1

| ARP-Before Learning | | | |
|---|---|---|---|
| Port | MAC Address | IP Address | VLANs Enabled |
| MCU #1 Port 10 | 02:00:00:01:6f:11 | Unknown | Build 1, Build 2, |
| | 02:00:00:01:6f:12 | Unknown | Build 3, Build 4 |
| MCU #2 Port 12 | 02:00:00:01:70:21 | Unknown | Build 1, Build 2, |
| | 02:00:00:01:70:22 | Unknown | Build 3, Build 4 |
| MCU #3 Port 6 | 02:00:00:01:71:31 | Unknown | Build 1, Build 2, |
| | 02:00:00:01:71:32 | Unknown | Build 3, Build 4 |
| MCU #4 Port 7 | 02:00:00:01:73:51 | Unknown | Build 1, Build 2, |
| | 02:00:00:01:73:52 | Unknown | Build 3, Build 4 |

FIG. 5, at step 510, starts with enabling each of the VLANs as shown above in Table 1. If the ARP table is not populated, as is the example in Table 1, method 500 at step 515 terminates until the table is populated. In an embodiment, the switch host, or as referred to in FIG. 2, the auxiliary core manager 215-1 for MCU 210-1 and/or auxiliary core manager 215-2 for MCU 210-2 may send a command to each detected MAC address to retrieve the associated IP addresses and assigned VLANs. The result of such a request is shown in Table 2 with the ARP table now populated.

TABLE 2

| ARP-Populated | | | |
|---|---|---|---|
| Port | MAC Address | IP Address | VLANs Enabled |
| MCU #1 Port 10 | 02:00:00:01:6f:11 | 10.22.1.119 | Build 1, Build 2, |
| | 02:00:00:01:6f:12 | 10.22.1.132 | Build 3, Build 4 |
| MCU #2 Port 12 | 02:00:00:01:70:21 | 10.22.1.129 | Build 1, Build 2, |
| | 02:00:00:01:70:22 | | Build 3, Build 4 |
| MCU #3 Port 6 | 02:00:00:01:71:31 | 10.22.1.130 | Build 1, Build 2, |
| | 02:00:00:01:71:32 | 10.22.1.124 | Build 3, Build 4 |
| MCU #4 Port 7 | 02:00:00:01:73:51 | 10.22.1.130 | Build 1, Build 2, |
| | 02:00:00:01:73:52 | 10.22.1.127 | Build 3, Build 4 |

However, as shown in Table 2, at this point each of the detected MAC addresses have the associated VLANs enabled. Thus, method 500 may continue to disable VLANs that are not associated and authorized with a particular build at a specified MCU and port. Then, once the ARP table is populated and determined at step 515, as shown in the example of Table 2, at step 520, the variables N, X, and Y are set to a minimum value. Variable N may represent a MCU identifier, with variable X representing an IP address associated with the MCU #N, and variable Y representing a VLAN in the set of available VLANs. At step 525 a comparison may be made to determine if the IP address of a particular MCU identified by MAC address is linked to a specific VLAN. If not, then at step 530 a determination may be made as to whether X has reached a maximum value. If not, the X variable is indexed by one at step 535 and returned to step 525. If at step 525 the IP address of a particular MCU identified by MAC address is linked to a specific VLAN then at step 545 a determination may be made as to whether Y is maximized, if not Y is indexed by one at step 547 and returned to step 525.

If at step 530 X is maximized, then at step 532 the VLAN Y may be disabled from MCU #N port and continue to step 545. The method continues in this manner testing for Y being maximized at step 545, X being maximized at step 550, and N being maximized at step 555. Further, if X is not maximized at step 550 then the method continues to step 540 where Y is set to a minimum value and proceeds to step 535 where X is indexed. In a similar manner, if N is not maximized at step 555 then the method continues to step 560 where X and Y are minimized, and N is indexed, and the method continues to step 525.

The result of method 500 may be shown in the example below in Table 3.

TABLE 3

| ARP-After Learning/Disabling | | | |
|---|---|---|---|
| Port | MAC Address | IP Address | VLANs Enabled |
| MCU #1 Port 10 | 02:00:00:01:6f:11<br>02:00:00:01:6f:12 | 10.22.1.119<br>10.22.1.132 | Build 1 |
| MCU #2 Port 12 | 02:00:00:01:70:21<br>02:00:00:01:70:22 | 10.22.1.129 | Build 4 |
| MCU #3 Port 6 | 02:00:00:01:71:31<br>02:00:00:01:71:32 | 10.22.1.130<br>10.22.1.124 | Build 2 |
| MCU #4 Port 7 | 02:00:00:01:73:51<br>02:00:00:01:73:52 | 10.22.1.130<br>10.22.1.127 | Build 3 |

Table 3 illustrates an example where now a single VLAN is associated with each port of the switch and hence each detected build. It may be possible that in some cases there may be more than one VLAN being enabled on a specific switch port. The disabled VLANs are also indicated as a strikethrough, as these VLANs are not being used by the associated MCU/port.

Figure 6:
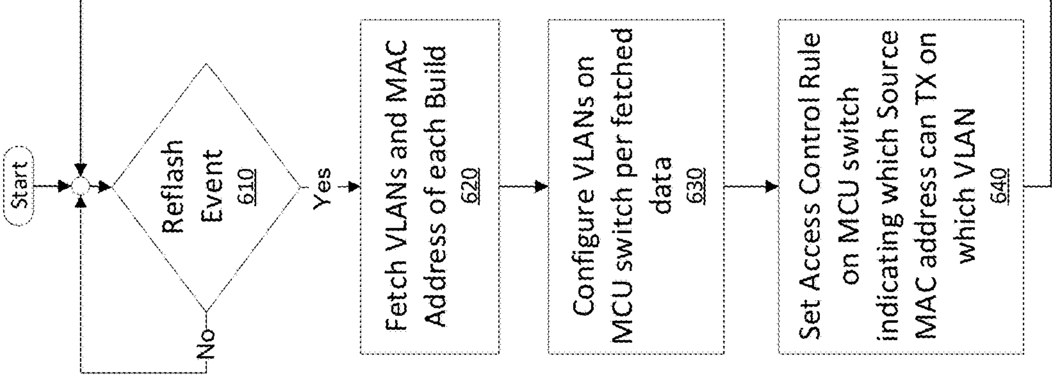
FIG. 6 is a flowchart of a switch configuration procedure following a reflash event, in accordance with the disclosure.

FIG. 6 illustrates a method 600 with filtering rules at the internal switch, according to an embodiment of the present disclosure. Method 600 is directed at utilizing the internal switch to verify that traffic marked with a VLAN tag originates from the proper MAC address associated with that VLAN. In the case of a mismatch then the internal switch may drop the associated traffic. As builds may change locations the switch may learn new MAC addresses and update VLAN-port associations each time a build may change locations. Such associations may be described by VLAN configuration and filtering rules based on an access control policy.

Starting at step 610 a reflash event may occur. If the reflash occurs then at step 620 the VLANs and MAC addresses associated with each build may be fetched. In some embodiments two implementation options may be offered. The first being where network configuration data that may be included or embedded in code being flashed to the auxiliary core manager, for example auxiliary core manager 215-1 and 215-2 discussed in FIG. 2, and then subsequently read by the corresponding local auxiliary core manager. Second, the auxiliary core manager may use an algorithm/subroutine to fetch information from specific locations in the code flash of each build.

At step 630 the VLANs may be configured on each MCU switch based on the fetched data in step 620. Then, at step 640 an access control policy on each MCU may be set to indicate which source MAC addresses can transmit on which VLAN.

Figure 7:
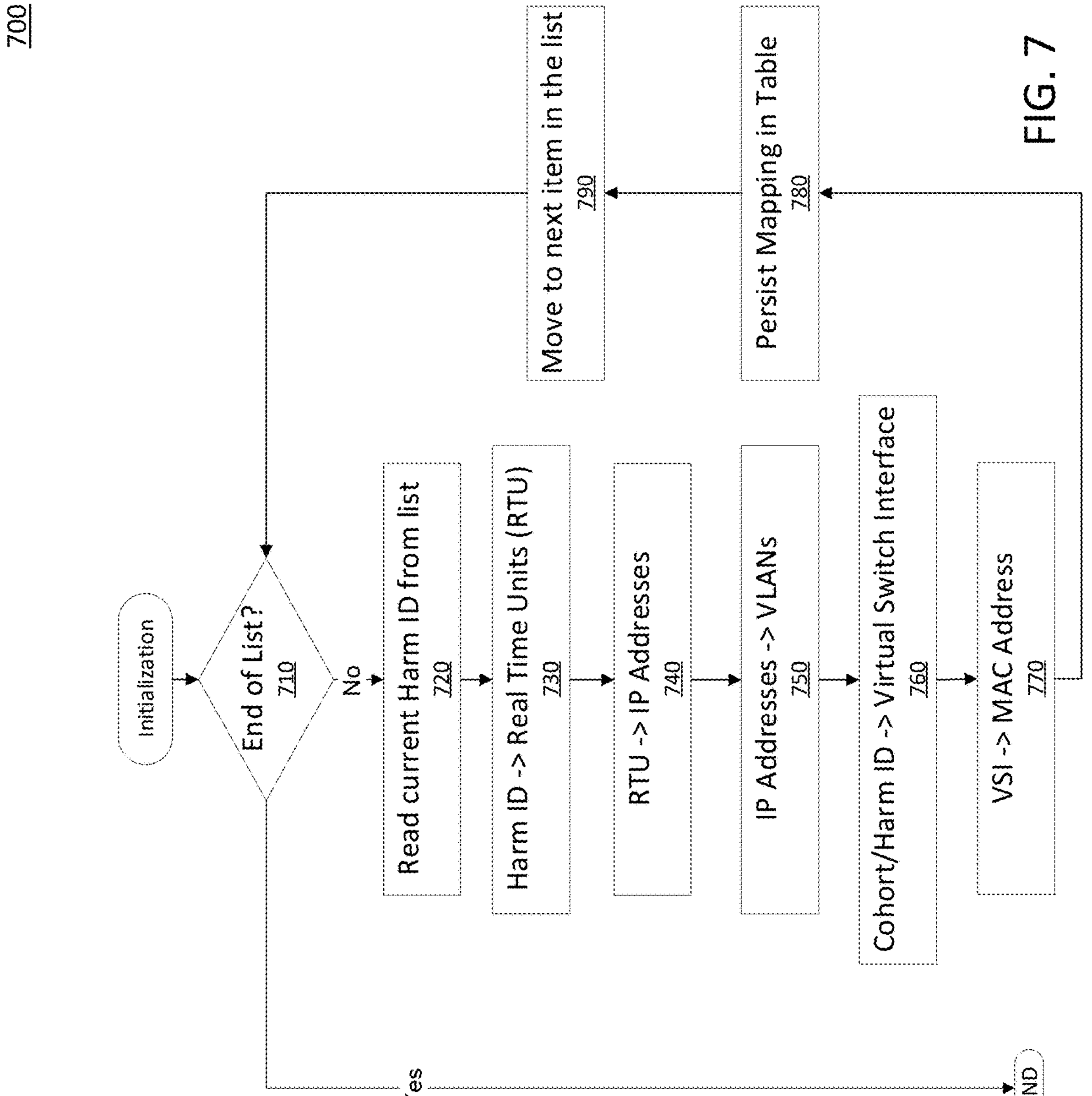
FIG. 7 is a flowchart of a network configuration fetching procedure, in accordance with the disclosure.

FIG. 7 illustrates a method 700 regarding fetching network configuration data, according to an embodiment of the present disclosure. FIG. 6, step 620, presented fetching VLAN and MAC addresses associated with each build. Method 700 starts with identifying a list of builds, or cohorts, and progresses through that list starting at step 710. At step 720 a harmonization identifier, which may also be referred to as a transaction identifier may be read from the list of builds. At step 730 the harmonization identifier may be mapped to a real time unit, RTU. A RTU may be hardware that is used to execute software that using a decoding algorithm provides the mapping. At step 740 the RTU may then be used to identify IP addresses and at step 750 those IP addresses may be used to identify the VLANs. Thus, in steps 730, 740, and 750 the harmonization identifier may be used to map to the identified VLANs. At step 760 the harmonization identifier may be mapped to a virtual switch interface and in step 770 the virtual switch interface may be mapped to a MAC address. Thus, in steps 760 and 770 the harmonization identifier may also be mapped to a MAC address. At which point at step 780 the mapping table may be updated and then proceed to the next item in the list at step 790.

Figure 8:
FIG. 8 depicts a flowchart of a method for network segment isolation with variable configurations in a vehicle, in accordance with the disclosure.
Figure 8:
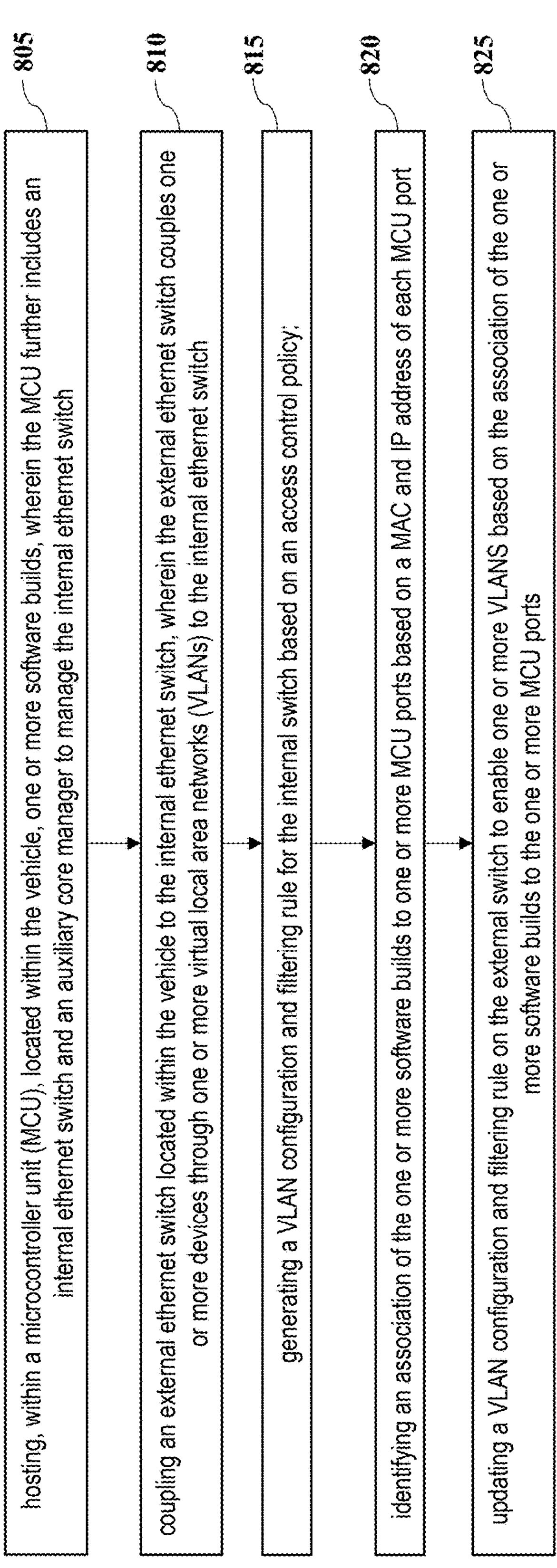

FIG. 8 depicts shows an exemplary embodiment of a flowchart method 800 of a method for network segment isolation with variable configurations in a vehicle, according to an embodiment of the present disclosure. Method 800 begins at step 805 with hosting, within a microcontroller unit (MCU), located within the vehicle, one or more software builds, where the MCU further includes an internal ethernet switch and an auxiliary core manager to manage the internal ethernet switch and the associated software builds. As discussed in FIG. 2, configuration 200 may include multiple MCUs where each MCU may contain one or more software builds and an internal switch, for example where the MCU includes an internal ethernet switch shown as internal switch 220-1 in MCU 210-1 and internal switch 220-2 in MCU 210-2 and where the internal switches may also be controlled by an auxiliary core manager with auxiliary core manager 215-1 controlling the internal switch 220-1 and with auxiliary core manager 215-2 controlling the internal switch 220-2. Further, the auxiliary core managers may also coordinate the installation and configuration of software builds including installation at the proper locations as specified in a VLAN configuration and filtering rule.

Method 800 may continue with step 810 that may include coupling an external ethernet switch located within the vehicle to the internal ethernet switch, where the external ethernet switch couples one or more devices through one or more virtual local area networks (VLANs) to the internal ethernet switch. As discussed in FIG. 2, configuration 200 may also include an external switch such as external switch 240 to connect one or more MCUs, e.g., MCU 210-1 and MCU 210-2 to other devices such as end devices including edge to bus (E2B) devices 250-1, 250-2, through to 250-N. The end devices may also include specialized electronic (SE) devices such as SE-DEV #1 255-1. In some embodiments, an SE device may include a processor and the ability to support cryptographic capabilities including authentication. In other embodiments E2B devices may not include a processor. In addition, VLANs may be shown as connecting, for example, trunk ports 235-1 and 235-2 to other access ports of the external switch 240, of which end devices may be coupled to those access ports of the external switch, for example access ports 237.

At step 815 method 800 may continue with generating a VLAN configuration and filtering rule for the internal switch based on an access control policy. As discussed with configuration 200, VLAN configurations may be determined by the generation of a VLAN configuration and filtering rule based on an access control policy. For example, configuration 200 illustrates that the VLANs associated with XXX build 212-2, YYY build 212-3, ZZZ build 212-4, and ABCD build 212-5 are isolated from end devices 250-1 and 250-2. And, in FIG. 6 where at step 640 an access control policy on each MCU may be set to indicate which source MAC addresses can transmit on which VLAN.

At step 820 method 800 may continue with identifying an association of the one or more software builds to one or more MCU ports based on a MAC and IP address of each MCU port. As discussed in Table 2 and discussed in FIG. 5, at step 510, starts with enabling the VLANs as shown above in Table 1. If the ARP table is not populated, as is the example in Table 1, method 500 terminates until the table is populated. In an embodiment, the switch host, or as referred to in FIG. 2, the auxiliary core manager 215-1 for MCU 210-1 and/or auxiliary core manager 215-2 for MCU 210-2 may send a command to each detected MAC address to retrieve the associated IP addresses and assigned VLANs.

At step 825 method 800 may continue with updating a VLAN configuration and filtering rule on the external switch to enable one or more VLANS based on the association of the one or more software builds to the one or more MCU ports. As discussed in Table 3, the table describes an example where a single VLAN is associated with each port of the switch and hence each detected build and that it may be possible that in some cases there may be more than one VLAN being enabled on a specific switch port. The disabled VLANs are also indicated as a strikethrough, as these VLANs are not being used by the associated MCU/port.

Method 800 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system of network segment isolation with variable configurations in a vehicle comprising:

a network within the vehicle that includes:

a microcontroller unit (MCU), located within the vehicle, which includes an internal ethernet switch and an auxiliary core manager, wherein the MCU is configured to host one or more software builds and the auxiliary core manager is configured to manage the internal ethernet switch and the one or more software builds; and an external ethernet switch located within the vehicle configured to couple one or more ports of the internal ethernet switch to one or more devices through one or more virtual local area networks (VLANs);

wherein upon an occurrence of a reflash event the auxiliary core manager is configured to generate a VLAN configuration and filtering rule for the internal switch based on an access control policy and to identify an association of the one or more software builds to one or more MCU ports based on a MAC and IP address of each MCU port; and wherein the auxiliary core manager is further configured to update a VLAN configuration and filtering rule on the external switch to enable one or more VLANs based on the association of the one or more software builds to the one or more MCU ports.

2. The system of claim 1, further comprising a second MCU, located within the vehicle, that includes a second internal ethernet switch and a second auxiliary core manager, wherein the second MCU is configured to host one or more software builds and the second auxiliary core manager is configured to manage the second internal ethernet switch.

3. The system of claim 1, wherein the filtering rules are applied at the external ethernet switch and wherein each of the one or more software builds are associated with a fixed IP address and a location dependent MAC address.

4. The system of claim 3, wherein the auxiliary core manager is configured to determine the location of the one or more software builds utilizing an Address Resolution Protocol (ARP).

5. The system of claim 1, wherein the filtering rules are applied at the internal ethernet switch and wherein each of the one or more software builds are associated with a fixed IP address and a location dependent MAC address.

6. The system of claim 5, wherein the internal ethernet switch is configured to verify communication between a software build and a device and wherein the verification includes matching configuration data including the location dependent MAC address with an associated VLAN.

7. The system of claim 6, wherein the configuration data is included within an auxiliary core manager build.

8. The system of claim 1, wherein the external switch is configured to be coupled an edge to bus device or a specialized electronic device.

9. The system of claim 3, wherein the auxiliary core manager is further configured to verify a configuration update at the external ethernet switch that includes receipt of a digital signature using a valid certificate.

10. The system of claim 5, wherein the auxiliary core manager is further configured to verify a configuration update at the internal ethernet switch that includes either a subroutine-based challenge-response or a calibration file-based method.

11. A method for network segment isolation with variable configurations in a vehicle comprising:

hosting, within a microcontroller unit (MCU), located within the vehicle, one or more software builds, wherein the MCU further includes an internal ethernet switch and an auxiliary core manager to manage the internal ethernet switch and the one or more software builds;

coupling an external ethernet switch located within the vehicle to the internal ethernet switch, wherein the external ethernet switch couples one or more devices through one or more virtual local area networks (VLANs) to the internal ethernet switch;

generating a VLAN configuration and filtering rule for the internal switch based on an access control policy;

identifying an association of the one or more software builds to one or more MCU ports based on a MAC and IP address of each MCU port; and updating a VLAN configuration and filtering rule on the external switch to enable one or more VLANs based on the association of the one or more software builds to the one or more MCU ports.

12. The method of claim 11, further comprising applying the VLAN configuration and filtering rule at the external ethernet switch and wherein each of the one or more software builds are associated with a fixed IP address and a location dependent MAC address.

13. The method of claim 12, further comprising determining, by the auxiliary core manager, the location of the one or more software builds utilizing an Address Resolution Protocol (ARP).

14. The method of claim 11, further comprising applying the VLAN configuration and filtering rule at the internal ethernet switch and wherein each of the one or more software builds are associated with a fixed IP address and a location dependent MAC address.

15. The method of claim 14, further comprising verifying, at the internal ethernet switch, communications between a software build and a device and wherein the verification includes matching configuration data including the location dependent MAC address with an associated VLAN.

16. The method of claim 15, wherein the configuration data is included within an auxiliary core manager build.

17. The method of claim 11, wherein the external switch is coupled to an edge to bus device or a specialized electronic device.

18. The method of claim 12, further comprising verifying a configuration update at the external ethernet switch that includes receipt of a digital signature using a valid certificate.

19. The method of claim 13, further comprising verifying, by the auxiliary core manager, a configuration update at the internal ethernet switch that includes either a subroutine-based challenge-response or a calibration file-based method.

20. A system of network segment isolation with variable configurations in a vehicle comprising:

a network within the vehicle that includes:

a first microcontroller unit (MCU), located within the vehicle, which includes a first internal ethernet switch and a first auxiliary core manager, wherein the first MCU is configured to host one or more software builds and the first auxiliary core manager is configured to manage the first internal ethernet switch and the one or more software builds;

a second microcontroller unit (MCU), located within the vehicle, that includes a second internal ethernet switch and a second auxiliary core manager, wherein the second MCU is configured to host one or more software builds and second auxiliary core manager is configured to manage the second internal ethernet switch; and an external ethernet switch located within the vehicle configured to couple the internal ethernet switch to one or more devices through one or more virtual local area networks (VLANs);

wherein upon an occurrence of a reflash event the auxiliary core manager is configured to generate a VLAN configuration and filtering rule for the internal switch based on an access control policy and to identify an association of the one or more software builds to one or more MCU ports based on a MAC and IP address of each MCU port;

wherein the auxiliary core manager is further configured to update a VLAN configuration and filtering rule on the external switch to enable one or more VLANs based on the association of the one or more software builds to the one or more MCU ports;

wherein the VLAN configuration and filtering rule is applied at the internal ethernet switch and at the external ethernet switch;

wherein each of the one or more software builds are associated with a fixed IP address and a location dependent MAC address;

wherein the internal ethernet switch is configured to verify communication between a software build and a device and wherein the verification includes matching configuration data including the location dependent MAC address with an associated VLAN; and wherein the external switch is configured to be coupled to an edge to bus device or a specialized electronic device.

* * * * *